No. 877,089. PATENTED JAN. 21, 1908.
F. S. KOCH.
METHOD OF MAKING ELECTRIC CONDENSERS.
APPLICATION FILED AUG. 15, 1904.
2 SHEETS—SHEET 1.
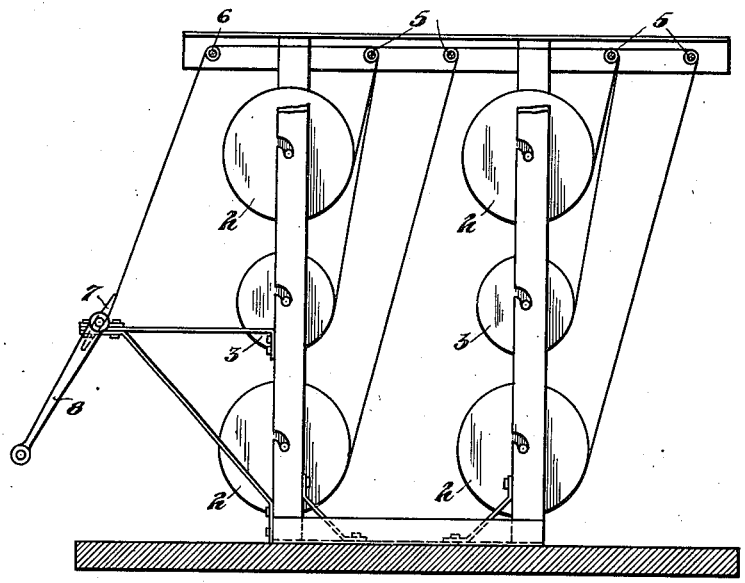
Fig. 1.
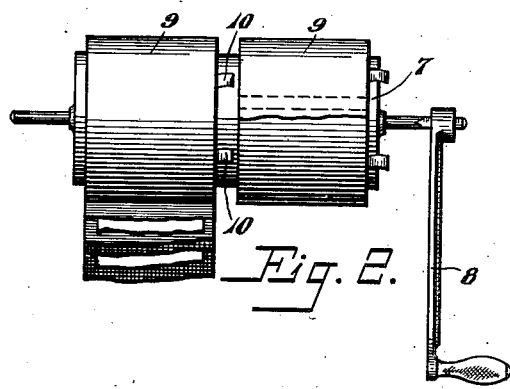
Fig. 2.
Fig. 3.
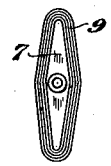
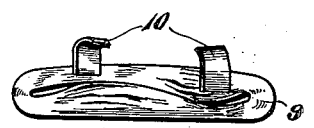
Fig. 4.
Fig. 5.
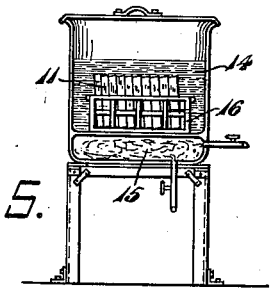
Witnesses.
R. H. Burfiend
Edith F Grier
Inventor:
Frank S. Koch,
By Robert Lewis Ames
Attorney.

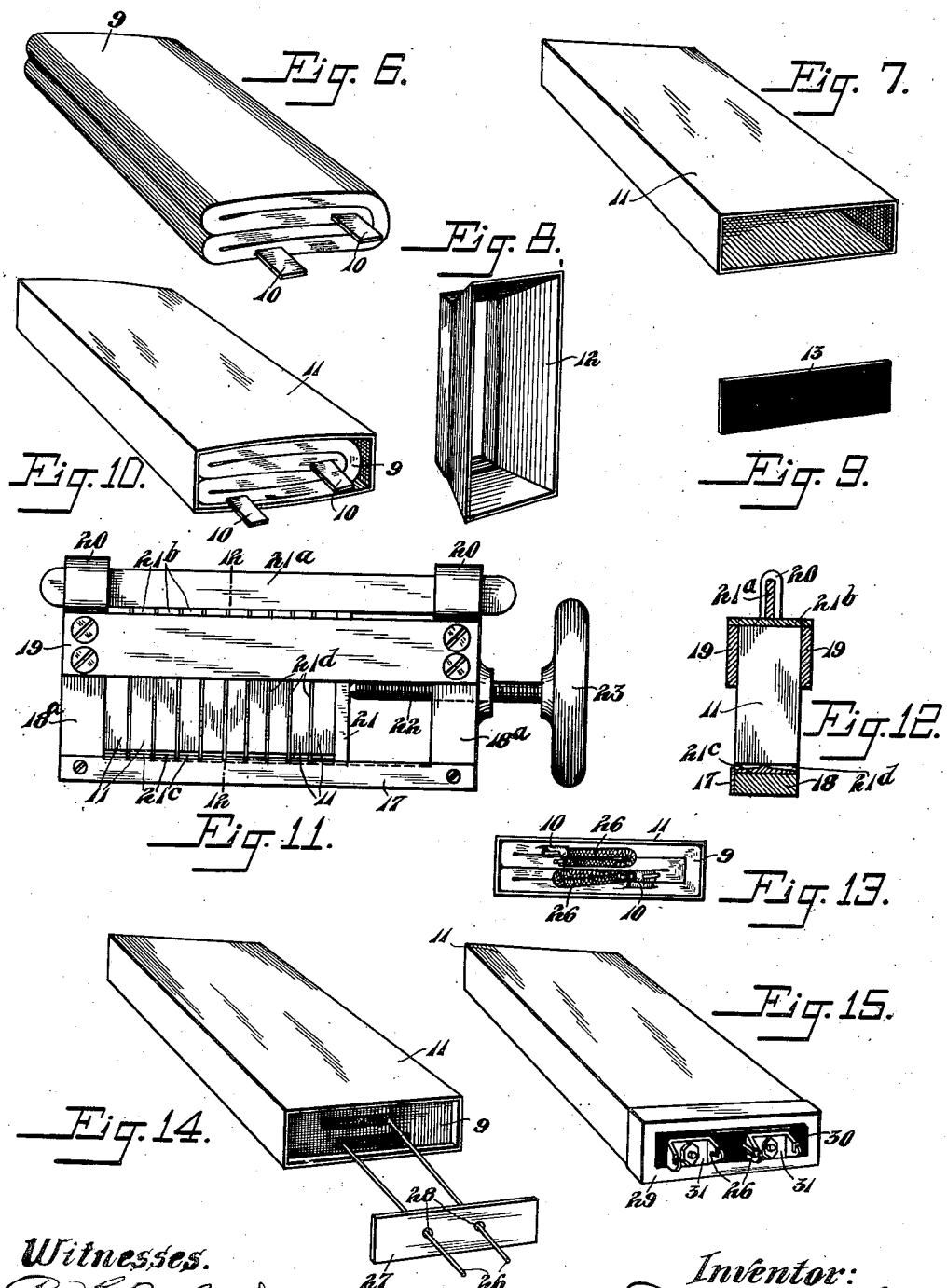

UNITED STATES PATENT OFFICE.

FRANK S. KOCH, OF CHICAGO, ILLINOIS, ASSIGNOR TO KELLOGG SWITCHBOARD & SUPPLY COMPANY, OF CHICAGO, ILLINOIS, A CORPORATION OF ILLINOIS.

METHOD OF MAKING ELECTRIC CONDENSERS.

No. 877,089.      Specification of Letters Patent.      Patented Jan. 21, 1908.

Application filed August 15, 1904. Serial No. 220,712.

*To all whom it may concern:*

Be it known that I, FRANK S. KOCH, a citizen of the United States, residing in Chicago, county of Cook, and State of Illinois, have invented certain new and useful Improvements in the Method of Making Electric Condensers, of which the following is a specification.

It is often desired to utilize certain space in and about electrical instruments and apparatus for the condensers that are associated with said instruments or apparatus, and to so construct said condensers that they shall have a maximum of insulation for the space in which they are required to be located and for the capacity they are required to have. I accomplish this result, which is one object of my invention, by providing means whereby for a given size of condenser I utilize the greatest number of turns of paper and tin foil or other dielectric and plates which can be placed in such space and which thereby increases the insulation and maintains the capacity.

In carrying out my invention I first provide a suitable tin box or other casing and place in the box through a suitable funnel or equivalent means, a condenser, preferably folded; then boil the same in paraffin or other suitable insulating material and compress the box to its normal size or the size desired, by means of a suitable tool or press which thus brings the completed condenser to the required size. The folded condenser may be rolled or wrapped in the usual manner from strips of paper and tin foil into a suitable flattened or oblong roll, and is thereafter folded and placed within the box as above stated.

Other objects of the invention are to so improve the methods of manufacture of condensers and the article itself as to cheapen the cost of the same and increase the efficiency throughout.

Still other objects and advantages will appear from the detailed description and claims to which reference is hereby made for a complete and full disclosure of the same.

The improvements are illustrated in the accompanying drawing in which the same reference characters are used throughout to designate like parts, and in which:

Figure 1 is a side view of the apparatus employed for rolling the condensers; Fig. 2 is a side view of the form upon which the condensers are adapted to be wound; Fig. 3 is an end view of the same; Fig. 4 is an end view of the roll after it is taken from the form; Fig. 5 is a view of the paraffin bath to which the condensers are subjected; Fig. 6 is a perspective view of the roll after it is folded; Fig. 7 is a similar view of the box or casing; Fig. 8 is also a perspective view of the funnel by means of which the folded roll is inserted in the casing; Fig. 9 is a similar view of the insulating block placed in the bottom of the box; Fig. 10 shows the folded condenser placed within the box or casing; Fig. 11 is a side view of a tool or press by means of which the boxes containing the condensers are compressed to normal size after having been subjected to the paraffin bath; Fig. 12 is a cross section of said press; Fig. 13 is an end view of the condenser after it has been compressed and the wire terminals are attached; Fig. 14 is a view of the box containing the condenser after the open end has been filled with paraffin and the filling strip is being applied, and Fig. 15 is a perspective view of the completed condenser, showing the cap or cover applied to the box or casing and the terminals of the condenser mounted upon and insulated from the said cap.

Referring to Fig. 1, suitable rolls 2 of paper or other dielectric of the desired width are rotatably supported upon a frame and between them is similarly situated a corresponding roll 3 of tin foil or other material forming the plates of the condensers, the width of the foil being slightly less than that of the paper as indicated in Fig. 2. These strips of paper and the tin foil are carried up over the guiding rolls 5 at the upper part of the frame and thence down over another roll 6 to the rolling form 7. Two such sets of rolls are employed since the tin foil from the rolls 3 form the two plates of the condenser. When the handle 8 of the form 7 is rotated therefore the strips of material are drawn off from said rolls and form an oblong or flattened roll 9, as shown in Fig. 3; the plates of the condenser being between two strips of paper, although one intermediate strip only might be employed. The terminals 10, consisting of thin metal strips, preferably of tinned copper ribbon, are slipped into position as the rolls are being made, each in contact with one of the strips of tin foil. Plain rice paper has been found satisfactory for the dielectric. As indicated in Fig. 2, one or more rolls 9 may be formed at the same time. Fig. 4 indicates the roll after it is removed from the form 7 and before folding. Other forms of rolls may obviously be used if preferred.

After the condenser has been rolled it is preferably though not necessarily folded into U shaped (as shown in Fig. 6) or in any other desired manner, and is then placed within the box or casing 11, as shown in Fig. 7, this casing being preferably of tin and having one open end; it is of the size desired for the completed condenser. In order to more easily insert the folded condenser a funnel 12, as shown in Fig. 8, is provided, said funnel being also preferably formed of tin with the smaller end of such size as to conveniently but closely fit within the open end of the box 11. Before inserting the condenser or funnel a strip 13 of suitable insulating material, such as red fiber, is placed in the bottom of the box 11 to prevent the plates of the condenser from coming into contact with the end of the box and thus being short-circuited, although this may be dispensed with in view of the fact that the said plates are narrower than the strips of paper.

After having inserted the plate 13 and the funnel 12 into casing 11, the preferably folded condenser, as shown in Fig. 6, is inserted through the flaring mouth of the funnel by means of which it is compressed as it is slipped into the box. Owing to the flexible nature of the sides of the box and the fact that the folded condenser is larger, the box assumes a bulging form as shown in Fig. 10 when the roll has been placed therein. The next step in the process of forming the condenser is to submit it to a bath of molten paraffin or other suitable insulating substance. A bath 14, suitable for the purpose, is indicated in Fig. 5, the paraffin being preferably maintained at a temperature of about 240 to 260 degrees Fahrenheit by means of a suitable steam-heated jacket 15, and in which both the condensers in their boxes are allowed to remain for from three to five hours until the rolls are thoroughly impregnated with the paraffin and the moisture and air are driven off. As shown, a plurality of said condensers may be boiled at one time, a suitable crate or rack 16 being provided by means of which they may be readily placed in and removed from the said bath. In this boiling operation all open space in the box is filled with the paraffin and the absorption of the boiling material by the roll itself results in swelling the folded roll to greater size than when first placed in the box in its dry condition and thus still further bulging the cases or boxes 11.

After the condensers have been boiled in the paraffin for the proper length of time they are removed and placed in a suitable press or tool, such as shown in Fig. 11, and are reduced by pressure to their normal size. This device which I have shown consists of a lower bar or sill 18 having posts $18^a$ secured thereto, one at each end, with the side bars 19 extending between the upper ends of said posts and secured to the sides thereof. The boxes or cans 11 are adapted to be placed in this press one by one and since each must be compressed to the same size a loose block $21^c$ of the proper width is placed beneath each can, the upper faces of said blocks being tapered from the middle toward each end (as shown in Fig. 12) to facilitate draining off the paraffin that is squeezed out of the cans when pressure is applied to them. A strip 17 projecting slightly above the sill 18 is secured to one side thereof and serves as a guide when rapidly placing the said blocks in position. A top spacing block $21^b$ of the same or the desired width is then placed above the can as indicated in Figs. 11 and 12. A small plate of sheet steel $21^d$ reaching from the sill 18 to a point between the blocks $21^b$ is placed between the adjacent condensers. A slidable block 21 is located at the end of the number that it is desired to compress and a screw 22 provided with a hand wheel 23, threading through the end post $18^a$ serves to press said block 21 against the row of condensers. As pressure is applied the cans are brought to the right size by means of the plates $21^d$ which are properly spaced at their upper and lower ends by the blocks $21^b$ and $21^c$. To prevent the mass rising while being compressed loops 20 are provided upon each end post and a bar $21^a$ is slipped therethrough to hold them down.

After subjecting the condensers to the paraffin bath suitable terminal strips 26, consisting of wires covered with insulation are soldered to said tinned ribbons 10, which are then folded or curled over on top of the condenser as shown in Fig. 13, with their bared or stripped ends projecting outwardly. The ends of the cans or boxes are then filled in with more paraffin or a suitable sealing wax which fills in and around the wires 26 to permanently seal the end of the box and to form a more or less rigid support for the wires 26. A suitable block 27 similar to block 13, except that it is provided with apertures 28 for the passage of terminal wires 26, is placed in the open end of the box upon the paraffin. A cap 29, preferably of tin or fiber, is then placed upon the box 11 to close its open end and is soldered thereto. This cap carries an insulating plate 30 upon which are mounted suitable terminal metallic clips 31 convenient for securing the same in an electric circuit and the inner ends of which are soldered to the projecting wires 26, which are brought up through the cap and through the insulating block 30.

By this manner of construction of the condensers the maximum insulation is provided for a given size and capacity. The interior of the box is completely filled and presents a solid mass, there being no waste space inside since it is unnecessary to provide a clearance as in the case where the condenser is first formed and then placed within the can or box.

It is apparent that various means and methods differing in matters of detail from that described may be employed for accomplishing the objects of my improvements; hence I do not desire to be limited in all respects to such as are herein set forth.

Having thus described my invention what I claim is.

1. The process of making a condenser, consisting of suitably assembling the plates and dielectric material, placing said assembled elements in a retaining can or casing, immersing said can and its contents in paraffin or wax at a high temperature to thereby impregnate the dielectric material with the paraffin, and to permit the paraffin to fill all the crevices and corners of the can, whereby the contents of the can when cold is a solid mass, and subjecting the can and its contents to heavy pressure to remove the surplus paraffin and bring the plates into intimate inductive relation, substantially as described.

2. The process of making condensers consisting in assembling the conductors and dielectric, placing the same in an inclosing case, submerging the case and parts in a molten dielectric material, and subjecting the case and parts to pressure, substantially as described.

3. The process of making condensers which consists in assembling the conductors and dielectric, forcing the assembled parts into an inclosing case, submerging the case and parts in a molten dielectric material, removing the case and contents and subjecting the whole to pressure, substantially as described.

4. The process of making condensers which consists in assembling the conductors and dielectric, forcing the assembled parts into an inclosing case, submerging the case and parts in a molten dielectric, material, removing the case and contents and subjecting the whole to pressure, and allowing the dielectric material to harden under pressure, substantially as described.

In witness whereof, I hereunto subscribe my name in the presence of two witnesses.

FRANK S. KOCH.

Witnesses:
ROBERT LEWIS AMES,
EDITH F. GRIER.